Sept. 4, 1956  H. E. ROSE ET AL  2,762,010

DIFFERENCE CIRCUIT

Filed April 30, 1954

INVENTORS
*Harry E. Rose &*
*Harry J. Woll*
BY *Morris Liebman*
ATTORNEY

United States Patent Office 2,762,010
Patented Sept. 4, 1956

2,762,010

DIFFERENCE CIRCUIT

Harry E. Rose, Haddonfield, and Harry J. Woll, Haddon Heights, N. J., assignors to Radio Corporation of America, a corporation of Delaware Application April 30, 1954, Serial No. 426,864

14 Claims. (Cl. 323—4)

This invention relates to circuits that provide a high variational impedance to increments of current, and in particular to the employement of such a circuit for detecting differences between two currents.

It is often necessary to determine the difference between two currents and to provide an error signal that varies in accordance with the difference. A common method of determining the difference between currents is to convert the currents to voltages and use a difference amplifier or summing resistor network to determine the difference between the corresponding voltages. Another method is to parallel the sources of the two currents and connect the sources in series with a common resistor. The voltage across the resistor is a measure of the sum of the currents. Increments in one of the currents, the signal current, results in a change in voltage, or error signal, across the common resistor, which error signal is a measure of the difference in currents. By means of a feedback circuit, the error signal is employed to adjust the other current. The feedback is such that an increment in the signal current tends to produce an equal and opposite increment in the adjusted current. The larger the value of the common resistor, the more closely do increments in adjusted current follow increments in signal current, and the more accurately does the error signal measure increments of signal current. With a practical limit set to the voltage supply, and with application requirements determining the magnitudes of the currents, the magnitude of the common resistor that may be employed is fixed. Thus, only a limited accuracy is possible with the present system.

Accordingly, it is among the objects of this invention to provide:

1. A new and improved system for determining differences between currents;
2. An improved system for determining differences between currents simply and accurately;
3. An improved circuit for determining differences between currents that has greater accuracy than prior art circuits and that is economical in the components required;

A feature of the present invention is the employment of a high variational impedance in place of the fixed common resistor.

Additional objects of this invention are to provide:

4. A new and improved circuit for presenting a high incremental or variational impedance to increments of current and a relatively small impedance to direct currents; and
5. An improved circuit for presenting a high variational impedance to increments of current that is simple in operation and useful commercially.

In accordance with this invention, an electron control device in the form of a first grid-controlled vacuum tube is used as a variational impedance. A cathode resistor is connected at one terminal to the cathode of the tube and at a second terminal to the anodes of two current generator tubes. The two current generators are, thereby, connected in parallel with each other and in series with the first tube. The grid of the first tube is coupled to the second resistor terminal through a battery so that voltage changes at the second terminal do not affect the grid-cathode bias. One of the current generators receives input signals. An increment of current in the signal generator produces an error voltage at the second resistor terminal. The error voltage is fed back through an amplifier to the other current generator to produce a corresponding current increment of opposite polarity. The first tube and resistor circuit operates as a source of substantially constant current. The constant current source presents to increments of current a variational impedance that is many times greater than the direct current impedance because of feedback dependent upon the amplification factor of the tube. Thus, the error voltage is an accurate measure of the current increments.

In another embodiment of this invention, a unity-gain amplifier having zero phase shift is employed to maintain a substantially constant grid-cathode bias. A cathode-fed amplifier tube is coupled through a cathode-follower buffer to the second resistor terminal. The anode voltage of the amplifier tube is applied to the grid of the constant current tube. The grid of the amplifier tube may be biased through a resistor divider from the operating voltage source. In this way, the battery, which is undesirable in commercial circuits, may be eliminated.

The foregoing and other objects, the advantages and novel features of this invention, as well as the invention itself both as to its organization and mode of operation, may be best understood when read together with the accompanying drawing, in which like reference numerals refer to like parts, and in which.

Figure 1:
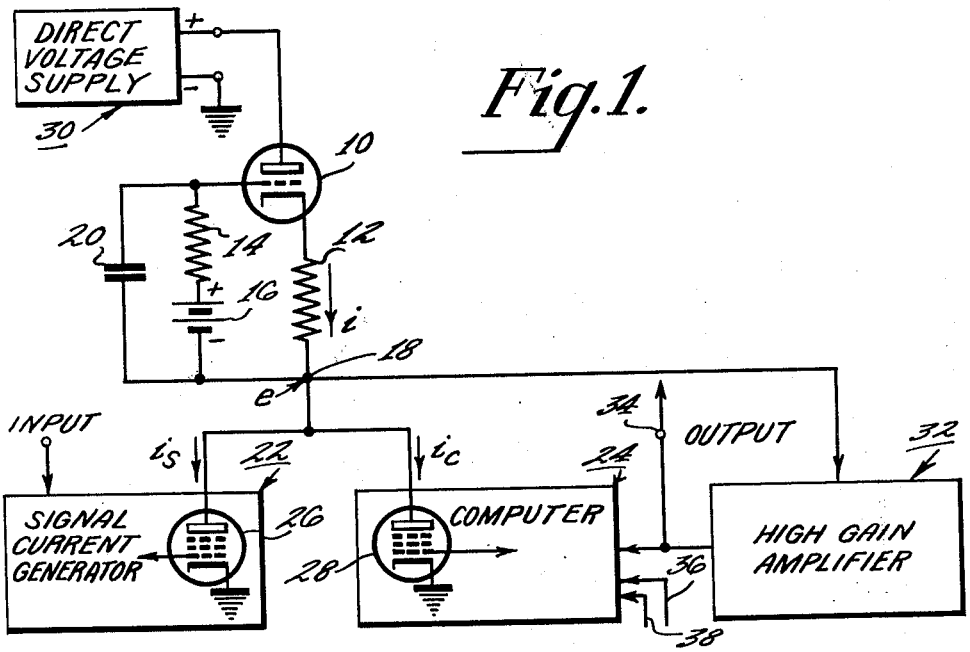
Figure 1 is a schematic circuit and block diagram of an embodiment of this invention.

Referring to Figure 1, a difference circuit in accordance with this invention includes a grid-controlled electron tube 10 which functions as a source of constant current. The cathode of the tube 10 is connected to one terminal of a cathode resistor 12. The grid of the tube 10 is connected through a current limiting resistor 14 and a bias battery 16 to another terminal 18 on the resistor 12. A capacitor 20 is also connected between the grid of the tube 10 and the resistor terminal 18. Connected to the resistor terminal 18 are first and second current generators 22, 24 shown as including separate pentode tubes 26, 28. The anodes of the generator tubes 26, 28 are connected in parallel with each other and in series with the constant current tube 10 through the resistor terminal 18. The positive side of a direct voltage supply 30 is connected to the anode of the constant current tube 10. The cathodes of the pentode tubes 26, 28 are returned to the negative side of the voltage supply 30 which is indicated by the ground symbol.

Input signals are applied to the first current generator 22. The resistor terminal 18 is connected through a feedback loop to the second current generator 24. The feedback loop is shown as including a high gain amplifier 32 and a computer that forms part of the second current generator 24. An output terminal 34 is connected to the output of the high gain amplifier. The circuit shown in Figure 1 has special application in the color-correction computer apparatus described in the U. S. Patent to Hardy, et al. No. 2,434,561, granted January 13, 1948. The difference circuit shown in Figure 1 is used in place of the subtractors shown in Figures 3, 3a and 8 of the aforementioned Hardy patent. In the color-correction apparatus, the grid of the signal generator tube 26 receives input voltages from photocells (not shown). The computer 24 is one of the computing channels shown in the Hardy patent which receives the amplified error voltage from the feedback amplifier 32 and also other voltages on channels 36, 38 in other feedback loops (not shown). The computer current generating tube 28 shown in Figure 1 may be employed as the collector tube shown in Figure 6 of the Hardy patent.

With changes in the input signal, there is an increment in the current $i_s$ in the signal generator tube 26. The increment of current tends to produce a change in voltage at the resistor terminal 18. This error voltage is fed back through the high gain amplifier 32 to the computer 24. As a result, there is an increment in the current $i_c$ in the computer current generator tube 28. The current increment in the computer generator tube 28 is substantially equal to and of opposite polarity to the current increment in the signal generator tube 26. Thus, the current through the resistor 12 tends to be maintained constant and the voltage at the error voltage terminal 18 also tends to be maintained constant. Actually, there are small voltage changes at the error voltage terminal 18, which, when amplified, provide a measure of the current increment in the signal generator tube 26. With constant voltages on the other feedback channels, 36, 38, the voltage at the output terminal 34 is proportional to the current in the signal generator tube 26. With varying voltages on the feedback channels 36, 38, the proportionality of the output voltage is in accordance with the color-correction equations described in the aforementioned Hardy patent.

The series resistance $r$ of the constant current tube 10 and cathode resistor 12 that is presented to increments of current is $r=r_p+(1+\mu)R_1$, where $r_p$ is the dynamic plate resistance of the tube 10, $\mu$ is the amplification factor, and $R_1$ is the resistance of the cathode resistor 12. This incremental or variational resistance is greater than the direct current resistance by a factor dependent upon the amplification factor $\mu$. The circuit shown in Figure 1 was built employing both triode units of a 6J6 in parallel as the constant current tube 10. With the resistance $R_1$ of the cathode resistor 12 equal to 6800 ohms, the variational resistance $r$ is approximately 250,000 ohms. The constant current $i$ through the circuit is approximately 7 milliamperes. With the same direct voltage supply, and with a fixed resistor replacing the variational impedance circuit, the maximum resistance allowable to produce the same current $i$ is 17,000 ohms. Thus, it is seen that a substantially larger impedance is presented by the constant current circuit to increments of current which results in a greater accuracy in the error voltage as a measure of increments of signal current.

The biasing battery 16 connected between the grid of the constant current tube 10 and the error voltage terminal 18 maintains a constant voltage between the grid of the tube 10 and the terminal 18. Thus, the error voltage at terminal 18 is fed back to the grid of the tube 10 to vary the impedance of the tube 10 and maintain the current $i$ substantially constant. The battery 16 establishes the proper grid-cathode bias for the desired direct anode current. Without the battery 16, the positive cathode bias due to the voltage drop across the cathode resistor 12 would tend to cut off the tube 10. The higher the battery voltage, the larger is the cathode resistor that may be used, and, therefore, the greater is the variational impedance presented by the circuit. The current limiting resistor 14 connected to the grid of the tube 10 is a high resistance to assure "shelf" life to the battery 16 when, for example, the heaters are left on and the direct voltage supply 30 is turned off. A miniature 45 volt bias battery 16 is used with a limiting resistor 14 of about 200,000 ohms. The capacitor 29 between the grid of the tube 10 and the error voltage terminal 18 permits the handling of rapid changes in the error voltage and is given a value of several hundred micromicrofarads.

Figure 2:
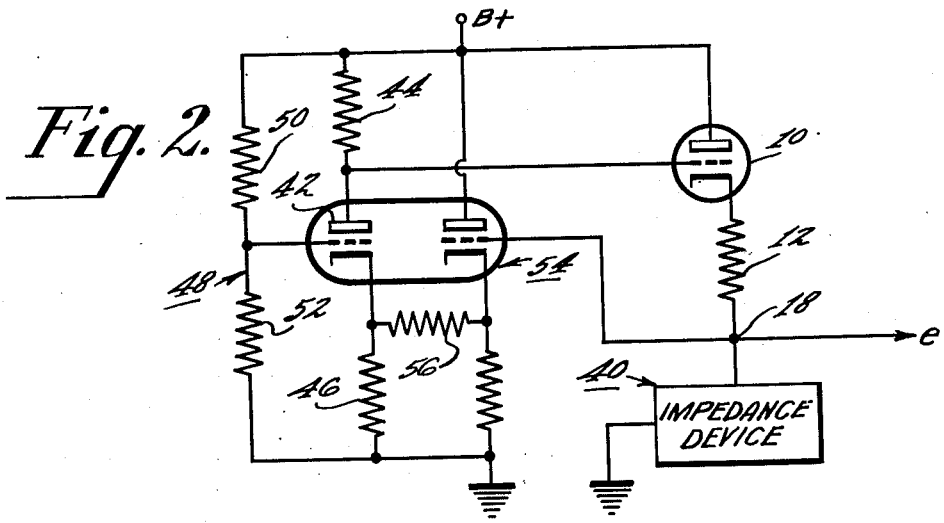
Figure 2 is a schematic circuit diagram of another embodiment of the invention.

In Figure 2, there is shown an embodiment of the invention in which the bias battery 16 with its "shelf" life limitation in reliability is eliminated. The variational-impedance circuit includes the tube 10 and cathode resistor 12 as in Figure 1. Connected to the error voltage terminal 18 is an impedance device 40 which produces a voltage at the error voltage terminal 18 that varies with respect to the reference potentials of the circuit. The impedance device may include the signal current generators 22, 24 shown in Figure 1 or any other appropriate current source. The impedance device may also be an element such as a capacitor which produces a varying voltage at terminal 18 as it charges and discharges. A grid-controlled amplifier tube 42 is employed instead of the battery 16. Anode and cathode resistors 44 and 46 are respectively connected to the anode and cathode of the amplifier tube 42. The grid of the amplifier tube 42 is biased through a voltage divider 48 made up of two resistors 50, 52 connected in series. The junction of the voltage divider resistors 50, 52 is connected to the grid of the amplifier tube 42. The operating voltage supply B+ is connected across the amplifier tube 42 circuit and across the voltage divider 48. The error voltage terminal 18 is coupled through a cathode follower buffer 54 to the cathode of the amplifier tube 42. An isolating resistor 56 is connected between the cathodes of the amplifier tube 42 and the buffer tube 54. The anode of the amplifier tube 42 is connected directly to the grid of the constant current tube 10.

The anode and cathode resistors 44 and 46 and the isolating resistor 56 are adjusted to provide unity gain between the error voltage terminal 18 and the anode of the amplifier tube 42. The proper voltage level for the grid of the constant current tube 10 is determined by the grid voltage of the amplifier tube 42. Changes in voltage at the error voltage terminal 18 result in the same voltage changes at the anode of the amplifier tube 42. Due to the error voltage being fed to the cathode of the amplifier tube 42, the anode voltage of the amplifier tube 42 varies in the same direction as the error voltage. Thus, the voltage between the grid of the constant current tube 10 and terminal 18 is maintained substantially constant notwithstanding variations in voltage level of the error voltage terminal 18 with respect to the reference potentials of the direct voltage supply. Moreover, the grid of the constant current tube 10 may be biased to any appropriate voltage level by means of the voltage divider 48.

It is seen from the above description of this invention that an improved circuit is provided for determining differences between currents. The circuit is simple, economical and accurate. An improved variational impedance circuit is provided that is simple in operation and commercially useful.

What is claimed is:

1. A difference circuit comprising a first and a second current generator, and means for producing a voltage signal in accordance with differences in magnitude between the currents generated by said first and second current generators, said signal producing means including a control device having anode, cathode and control electrodes, an impedance connected at one terminal thereof to said cathode electrode, means coupling said control electrode to another terminal of said impedance to apply with substantially zero phase shift voltage variations at said another terminal to said control electrode, means coupling said current generators in parallel with each other and in series with said control device through said another terminal, means for applying an operating potential across said control device and said current generators, and means coupled to said another terminal for deriving said voltage signal.

2. A difference circuit comprising a constant current circuit, a signal current generator, and means including another current generator for producing increments of current substantially equal to and of opposite polarity to increments of current in said signal current generator, said constant current circuit including an electron control device having anode, cathode and control electrodes, a resistor connected at one terminal thereof to said cathode electrode, and means coupling said control electrode to another terminal of said resistor, said current generators being coupled in parallel with each other and coupled in series with said current circuit through said another resistor terminal.

3. A difference circuit comprising, in combination, a constant current circuit, a signal current generator, a second current generator, means coupling said current generators in parallel with each other and in series with said constant current circuit, and means for controlling said second current generator in accordance with increments of current in said signal current generator, said constant current cicuit including an electon control device having anode, cathode and control electrodes, an impedance connected at one terminal thereof to said cathode electrode, and means coupling said control electrode to another terminal of said impedance.

4. The combination as recited in claim 3, wherein said means coupling said current generators in parallel with each other and in series with said constant current circuit is coupled to said another impedance terminal, and wherein said means for controlling said second current generator includes amplifier means coupled between said another terminal and said computed current generator.

5. The combination as recited in claim 4 wherein said current generators include separate unidirectional devices, said unidirectional devices being coupled to said another terminal to draw current in the same direction from said constant current circuit.

6. The combination as recited in claim 5 wherein said amplifier means is coupled between said another terminal and said computed current generator to produce increments of current in said second current generator substantially equal and of opoposite polarity to increments of current in signal current generator.

7. The combination as recited in claim 6 wherein said means coupling said control electrode to another terminal of said impedance includes a battery.

8. The combination as recited in claim 6 wherein said means coupling said control electrode to another terminal of said impedance includes amplifier means having unity gain and connected to produce voltage variations at said control electrode in phase with the voltage varitions at said another terminal.

9. The combination as recited in claim 8 wherein said unity gain amplifier means includes another electron control device having anode, cathode and control electrodes, anode and cathode resistors respectively connected to said anode and cathode electrodes of said another device, voltage divider means for applying a bias potential to said another device control electrode, means coupling said another device cathode electrode to said another impedance terminal, and means connecting said another device anode electrode to said constant current device control electrode.

10. In combination, a constant current circuit, a signal current generator, another current generator, means coupling said current generators in parallel with each other and in series with said constant current circuit, and feedback means for producing increments of current in said another current generator substantially equal and of opposite polarity to increments of current in said signal current generator, said constant current circuit comprising an electron discharge tube having anode, cathode and control electrodes, a resistor connected at one terminal thereof to said cathode electrode, and means coupling said control electrode to another terminal of said resistor, said feedback means including amplifier means coupled between said another terminal and said another current generator, said current generators including separate electron discharge tubes the anodes thereof being coupled to said another terminal.

11. A circuit providing a high variational impedance to increments of current comprising a first control device having anode, cathode and control electrodes, a resistor connected at one terminal thereof to said cathode electrode, an impedance device connected to another terminal of said resistor for producing voltage variations at said another terminal, amplifier means having substantially unity gain and substantially zero phase shift and coupled between said another resistor terminal and said control electrode for applying voltage variations at said another resistor terminal to said control electrode, and means for applying an operating potential across said first control device, said resistor and said impedance device in series.

12. A circuit as recited in claim 11 wherein said unity gain amplifier means includes a second control device having anode, cathode and control electrodes, separate resistors connected to said second device anode and cathode electrodes, voltage divider means for applying a bias potential to said second device control electrode, means for applying voltage variations at said another resistor terminal to said second device cathode electrode, means connecting said second device anode electrode to said first device control electrode, and means for applying an operating potential across said second control device and said voltage divider means.

13. A circuit as recited in claim 12 wherein said means for applying voltage variations at said another resistor terminal to said second device cathode electrode includes a cathode follower circuit.

14. A circuit as recited in claim 13 wherein said impedance device includes a variable current source.

References Cited in the file of this patent
UNITED STATES PATENTS
2,447,507    Kenyon _____ Aug. 24, 1948